May 5, 1925.

W. M. ZIEGLER 1,536,320

AUTOMATIC STUD DRIVER AND RELEASING MECHANISM

Filed Oct. 2, 1924

INVENTOR.
William M. Ziegler
BY
ATTORNEYS.

Patented May 5, 1925.

1,536,320

UNITED STATES PATENT OFFICE.

WILLIAM M. ZIEGLER, OF DAYTON, OHIO, ASSIGNOR TO THE APEX MACHINE COMPANY, OF DAYTON, OHIO, A CORPORATION OF OHIO.

AUTOMATIC STUD DRIVER AND RELEASING MECHANISM.

Application filed October 2, 1924. Serial No. 741,139.

*To all whom it may concern:*

Be it known that I, WILLIAM M. ZIEGLER, a citizen of the United States, residing at Dayton, in the county of Montgomery and State of Ohio, have invented certain new and useful Improvements in an Automatic Stud Driver and Releasing Mechanism, of which the following is a specification, reference being had therein to the accompanying drawing.

My invention relates to an automatic stud driver and releasing mechanism.

The object of my invention is to provide a driver for driving threaded stud members and the driving of such members to the predetermined position desired, and releasing the members automatically when the driver is reversed and backed off of the stud.

Due to the fact that when the reversing operation takes place the threads of the stud frequently stick on the threads of the driver which results in withdrawing the stud, nullifying the whole operation, it is my object to provide automatic mechanism which will prevent this occurring.

It is a further object of my invention to provide means of insuring proper engagement of the several parts during the driving operation and equally positive disengagement of the parts during the reverse operation.

Referring to the drawings.

Figure 1:
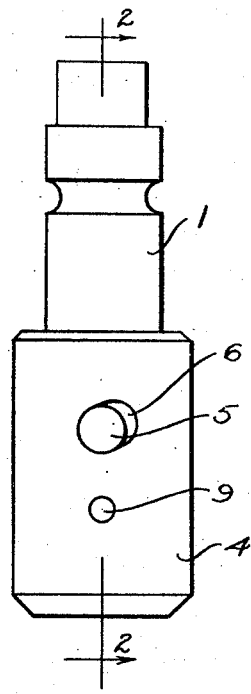
Fig. 1 is a side elevation of the exterior of the driver.

Referring to the drawings in detail, 1 is a driving shaft which may be mounted in any tool holder or the like. This shaft has a cut away portion 2 in which is located a helical spring 3. One end of this spring is located in the locking sleeve 4 and the other end is mounted in the driving shaft 1, so that the sleeve is constantly thrust downwardly.

A transverse pin 5 is located in the driving member 1 and has its ends projecting through the sleeve 4. The sleeve 4 is provided with diagonal slots 6 to permit it to move relatively to this pin 5.

Below the end of the driving member 1 is the locking plate 7 which has a notch 8 cut therein to receive the locking pin 9 carried by the sleeve 4. The lower end of the sleeve has a threaded aperture 10 for engaging with the threaded head 11 of the member to be driven such as the stud.

The end of the spring 2 is located in the slot 12 of the locking sleeve 4.

Figure 2:
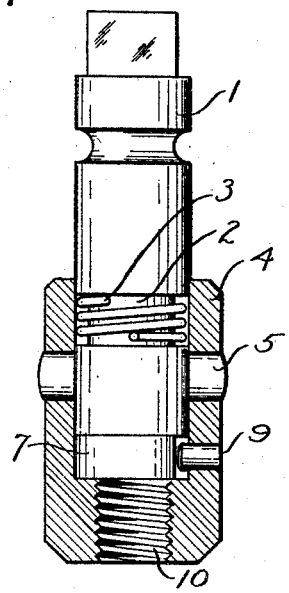
Fig. 2 is a view partially in section on the line 2—2 of Fig. 1, looking in the direction of the arrows, showing the driver in driving or locked position.
Figure 3:
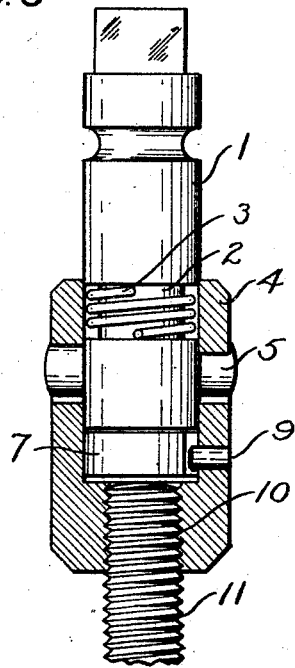
Fig. 3 shows a similar view of the driver and stud end with the driver just at the beginning of its reversing or retreating operation.
Figure 4:
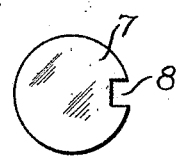
Fig. 4 is a plan view of the locking plate in the driver.
Figure 5:
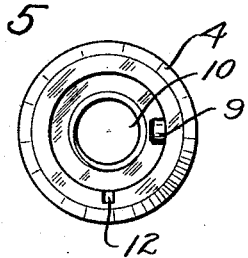
Fig. 5 is a plan view of the locking sleeve with the driving shaft and locking plate removed.

When the parts are in driving position as shown in Figs. 1 and 2, the pin 5 is in the lower end of the slot 6 of the sleeve 4. In the driving position the spring 2 has rotated the sleeve 4 to the left hand and thus brings the locking plate in locking engagement between the end of the driver 1 and the inner end of the sleeve 4. It is limited in its movement to the right hand by the pin 5 working in the cam slot 6. The rotation of the driver to the left hand keeps this pin 5 in the left hand end of the slot 6 which is the lower end.

When the driver is reversed so that the pin 5 is forced to the right hand of the slot 6 due to the diagonal location of the slot 6, the sleeve 4 is forced downwardly, thus unlocking the locking plate 7 which engaged the end of the stud 11 during the driving operation, permitting a disengagement of the end of the stud 11 by the locking plate 7 so that the stud driver may be backed off without retreating the threaded stud. I find that by thus disengaging the head of the stud, any reverse movement of the stud is eliminated, and the parts are quickly disengaged.

The locking plate being supplied from the driver permits the driver to slip on a plate. Heretofore, when the locking plate was not present in this type of tool, the end of the stud would have a tendency to burrow in the end of the driver, causing the two to stick together, so that the pin 5 would be moved backwardly slightly in the cam slots. This would result in a transverse and diagonal upwardly directed shear on the pins which would shear them off as they are not completely supported in the end of the slot during the period of strain as is the case in the present invention. The pins being deprived of these supports were bent or sheared off. The present invention eliminates this difficulty.

It will be understood that I desire to comprehend within my invention such changes and modifications which may be necessary to adapt it to varying conditions of use.

Having thus described my invention, what I claim as new and desire to secure by Letters Patent, is:—

1. In a stud driver, a driving member, a locking sleeve mounted thereon adapted to have limited rotation thereabout, the lower end of said sleeve having a threaded aperture for engaging with the stud, a yielding member engaging with said driver and with said sleeve to rotate one relative to the other, a cam slot in said sleeve, a transverse member carried by said driver engaging in said slot, a locking plate loosely mounted within said sleeve between the end thereof and the end of the driver adapted to engage the end of the stud during the driving operation and adapted to be moved upwardly by the locking sleeve during the retreating operation.

2. In a stud driver, a driving member, a locking sleeve mounted thereon adapted to have limited rotation thereabout, the lower end of said sleeve having a threaded aperture for engaging with the stud, a yielding member engaging with said driver and with said sleeve to rotate one relative to the other, a cam slot in said sleeve, a transverse member carried by said driver engaging said slot, a locking plate loosely mounted within said sleeve between the end thereof and the end of the driver adapted to engage the end of the stud during the driving operation and adapted to be moved upwardly by the locking sleeve during the retreating operation, said cam slot being located so that its major axis is at an angle to the major axis of the entire driver, the parts being so arranged that the pin working in said slot will be at the lower end thereof during the driving operation and at the upper end thereof during the retreating operation.

3. In a stud driver, a driving member, a locking sleeve mounted thereon adapted to have limited rotation thereabout, the lower end of said sleeve having a threaded aperture for engaging with the stud, a yielding member engaging with said driver and with said sleeve to rotate one relative to the other, a cam slot in said sleeve, a transverse member carried by said driver engaging in said slot, a locking plate loosely mounted within said sleeve between the end thereof and the end of the driver adapted to engage the end of the stud during the driving operation and adapted to be moved upwardly by the locking sleeve during the retreating operation, said cam slot being located so that its major axis is at an angle to the major axis of the entire driver, the parts being so arranged that the pin working in said slot will be at the lower end thereof during the driving operation and at the upper end thereof during the retreating operation, and means carried by the locking sleeve engaging with the locking plate to prevent rotation thereof but to permit the free up and down movement of said plate within the sleeve when the reversing operation takes place.

4. In a stud driver, a driving member, a groove cut therein, a helical spring in said groove, one end of said spring being attached to the driving member and the other end mounted in a slot in a locking sleeve, a locking sleeve adapted to reciprocate on the end of the driving member but to have its lower end spaced therefrom, a shoulder in the lower end of said sleeve, a threaded aperture communicating with the interior of said sleeve adjacent said shoulders, a locking plate interposed in the space between the end of the driver and said shoulders, said plate having a slot located vertically therein, and a pin located in said slot carried by said sleeve, a cam pin projecting on either side of said driving member and located transversely therein, cam slots cut in said locking sleeve on either side thereof in which said pins move, said slots being located diagonally of the major axis of the driver, whereby when the driver is in driving position the end of the stud will be engaged by the locking plate, and when the driver is in reversing position said plate will be backed away from the end of the stud to release the stud.

In testimony whereof I affix my signature.

WILLIAM M. ZIEGLER.